US012633114B2

(12) United States Patent
Guo et al.

(10) Patent No.: US 12,633,114 B2
(45) Date of Patent: May 19, 2026

(54) METHODS AND DEVICES FOR GESTURE RECOGNITION

(71) Applicant: Intel Corporation, Santa Clara, CA (US)

(72) Inventors: Ping Guo, Beijing (CN); Sangeeta Manepalli, Chandler, AZ (US); Lidan Zhang, Beijing (CN); Peng Wang, Beijing (CN); Yimin Zhang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 187 days.

(21) Appl. No.: 18/548,585

(22) PCT Filed: Jun. 22, 2021

(86) PCT No.: PCT/CN2021/101611
§ 371 (c)(1),
(2) Date: Sep. 1, 2023

(87) PCT Pub. No.: WO2022/266853
PCT Pub. Date: Dec. 29, 2022

(65) Prior Publication Data
US 2024/0161494 A1 May 16, 2024

(51) Int. Cl.
*G06V 40/20* (2022.01)
*G06T 5/50* (2006.01)
(Continued)

(52) U.S. Cl.
CPC ............... *G06V 10/98* (2022.01); *G06T 5/50* (2013.01); *G06T 5/73* (2024.01); *G06T 7/70* (2017.01);
(Continued)

(58) Field of Classification Search
CPC .......... G06T 2207/20201; G06F 3/017; G06V 10/82; G06V 40/28
See application file for complete search history.

(56) References Cited

U.S. PATENT DOCUMENTS

2015/0262002 A1      9/2015  Matsunaga
2018/0007269 A1 *   1/2018  Sclar ................... G06F 18/2411
(Continued)

FOREIGN PATENT DOCUMENTS

CN      111191627 A     5/2020
CN      111753764 A    10/2020
CN      111814626 A    10/2020

OTHER PUBLICATIONS

International Search Report of corresponding International Application No. PCT/CN2021/101611, dated Mar. 11, 2022, 3 pages (for informational purposes only).

*Primary Examiner* — Hadi Akhavannik
(74) *Attorney, Agent, or Firm* — VIERING, JENTSCHURA & PARTNER mbB

(57) ABSTRACT

Disclosed herein is a gesture recognition device that includes an input interface configured to receive a sequence of images, each image showing a body part with which a gesture is performed from a viewpoint of a camera. The gesture recognition device also generates a sequence of motion-compensated images from the sequence comprising generating a motion-compensated image for an image of the sequence by compensating the movement of the camera viewpoint from a reference camera viewpoint to the viewpoint from which the image shows the body part based on the image and a motion-compensated image of the sequence generated for a preceding image of the sequence which precedes the image in the sequence and estimate the gesture from the sequence of motion-compensated images.

14 Claims, 10 Drawing Sheets

(51) Int. Cl.

| | |
|---|---|
| *G06T 5/73* | (2024.01) |
| *G06T 7/70* | (2017.01) |
| *G06V 10/77* | (2022.01) |
| *G06V 10/82* | (2022.01) |
| *G06V 10/98* | (2022.01) |

(52) U.S. Cl.

CPC .......... *G06V 10/7715* (2022.01); *G06V 10/82* (2022.01); *G06V 40/28* (2022.01); *G06T 2207/10016* (2013.01); *G06T 2207/20081* (2013.01); *G06T 2207/20084* (2013.01); *G06T 2207/20201* (2013.01); *G06T 2207/30196* (2013.01); *G06T 2207/30244* (2013.01)

(56) References Cited

U.S. PATENT DOCUMENTS

| | | | |
|---|---|---|---|
| 2018/0218509 A1* | 8/2018 | Price ....................... | G01S 17/36 |
| 2019/0107894 A1* | 4/2019 | Hebbalaguppe ........ | G06F 3/017 |
| 2019/0197715 A1* | 6/2019 | Rebecq .................... | G06T 7/74 |
| 2019/0287283 A1* | 9/2019 | Lin ........................... | G06T 5/60 |
| 2020/0372246 A1 | 11/2020 | Chidananda et al. | |
| 2020/0382706 A1* | 12/2020 | Kang ................... | H04N 23/683 |
| 2021/0390748 A1* | 12/2021 | Liao ....................... | G06V 10/82 |

\* cited by examiner

300

301 Sensor Input to position robot/camera

Use of Audio/IR/Lidar sensor

302 Gesture input via camera 303 1. Motion Dis-entangling

Separate hand motion from any camera movement

304 Input Video Classification (Joint/Bone/Motion)

305 2. Gesture Net processing

Gesture output

METHODS AND DEVICES FOR GESTURE RECOGNITION

CROSS-REFERENCE TO RELATED APPLICATION(S)

This application is a national phase application of PCT/CN2021/101611, filed on Jun. 22, 2021, the contents of which is fully incorporated herein by reference.

TECHNICAL FIELD

Exemplary implementations described herein generally relate to methods and devices for gesture recognition.

BACKGROUND

Gesture recognition through visual understanding is a fundamental task in various fields, including robotic applications. Different gestures have different hand shapes and movements. Computer vision techniques may be used to classify different gestures, e.g., through both visual appearances and hand motions. However, gesture recognition methods typically assume that the camera is static, where the hand pose in image frames results from only from hand movements. Gesture applications as in virtual reality (VR) and augmented reality (AR) also typically assume the hand is close to the camera so that the hand size is big and clear for hand/key point detection. However, this assumption is not always true in robotic fields. For robots with mobility such as AMR (autonomous mobile robots), vacuum cleaning robots, robot arms, etc., the camera (which is attached to the robot) moves in a large and free space. In such an application, difficulties in gesture recognition arise because 1) hand and camera motions are coupled together in terms of image changes, which may lead to classification error towards hand motions and 2) hand images are easily blurred due to both camera motion and far distance. These difficulties may cause failure of hand detection, key point detection, gesture classification, etc. Accordingly, approaches for gesture recognition are desirable which allow reliable gesture recognition in particular in applications with strong camera movement.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 4 illustrates operation and training of a generator of a generative model used for gesture recognition according to an embodiment.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
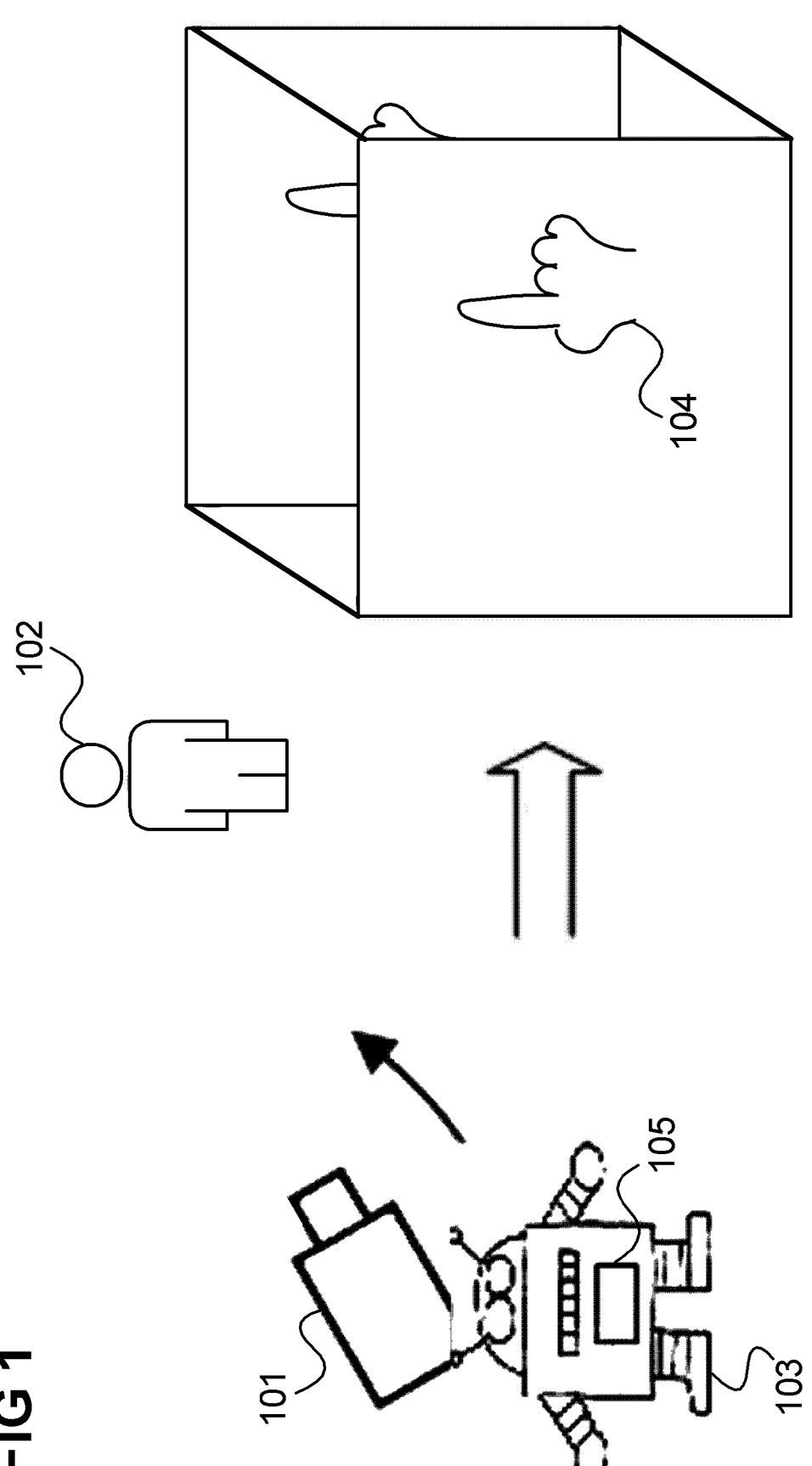
FIG. 1 illustrates a gesture recognition scenario where a camera taking pictures for recognition of gestures of a human user is mounted on a moving robot.

FIG. 1 illustrates a gesture recognition scenario where a camera 101 taking pictures for recognition of gestures of a human user 102 is mounted on a moving robot 103.

In a scenario of FIG. 1 where the camera 101 is moving with respect to the human user 102 because of movement of the robot 103, (e.g. an AMR (autonomous mobile robot), a gesture recognition approach which is based on the assumption that the camera is static or that they are only very small movements of the camera 101 with respect to the user due to camera movement and that the hand is close to the camera may not be suitable, i.e. may deliver bad results.

It should be noted that in the present and the following examples, gestures to be recognized are hand gestures performed by a human person with his or her hand 104. However, gestures may also be performed by other body parts (e.g. a gesture may be nodding with a head) and may also be gestures performed by body parts of non-human entities, e.g. another robot.

In a scenario where the camera is static and the hand close the camera, images of the hand are clear and the hand is shown with sufficient size for hand detection and hand key point detection. An example for such a scenario is image deblur and gesture control in phones and virtually reality (VR) or augmented reality (AR) devices, e.g. VR or AR glasses. Techniques used for those applications are typically only able to handle camera jitter or shake with limited movements which are small in comparison of the hand gesture movements. In those scenarios, the camera motion is caused by hand and head shakes which are very small movements compared to the gesture movements. Furthermore, in those scenarios, hands are near to the camera and are thus easy to detect. For example, in VR glasses, the distance from hand to camera is at most the length of human arm. This distance is good for hand detection since the hand region is big in the taken images.

In a robotic application such as an AMR, however, the robot-mounted camera often strongly moves. This may cause errors in dynamic gesture recognition for techniques for VR and AR applications. In addition, the user 102 may be far away from the robot 102, e.g., several meters away. So, the images of the hand may be blurred, and the hand may be shown with small size which may cause failure of hand detection and hand key point detection in techniques for VR and AR applications.

In view of the above, according to various embodiments, an approach for gesture recognition is provided which allows reliable gesture recognition in case of scenarios with free camera movement, e.g., using images taken from a camera mounted on a high-speed AMR whose movement may be much larger than the movement of the hand gesture which should recognized and where the hand may be far from the camera. For example, the robot 103 includes a gesture recognition device 105 configured to operate according to this approach.

Figure 2:
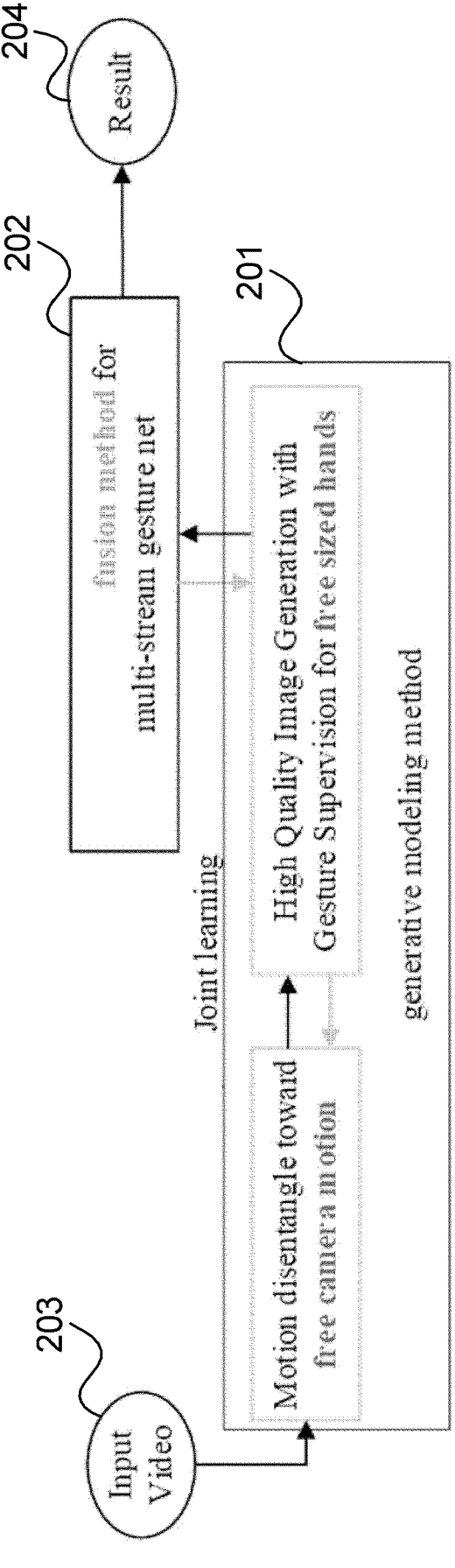
FIG. 2 illustrates an approach for gesture recognition according to an embodiment.

FIG. 2 illustrates an approach for gesture recognition according to an embodiment.

The approach includes processing of an input video 203 (i.e. a sequence of images showing a hand performing a gesture) by a generative model 201 and a fusion 202 of features generated from multiple gesture information streams by a multi-stream gesture map to generate a gesture recognition result 204.

The generative model 201 allows dealing with free sized hands and free camera motions. It combines motion disentangle (or compensation), image quality improvement, and gesture recognition together to boost the end-to-end performance.

The generative model 201 is trained by supervising it by a discriminator so that it is trained to enhance small sized or blurred hands for robust hand key point detection.

The two modules (generative model 201 and fusion 202) may interact with each other. They may be trained in a joint manner in an end-to-end fashion.

Figure 3:
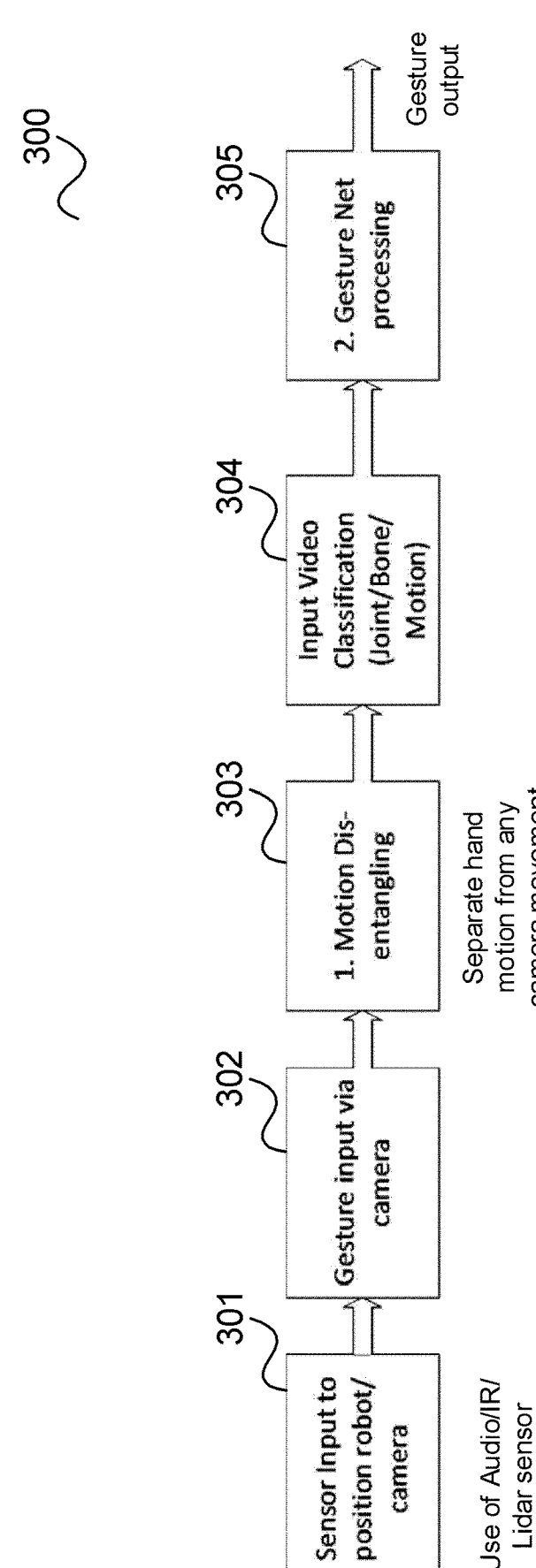
FIG. 3 shows a flow diagram for gesture recognition according to an embodiment.

FIG. 3 shows a flow diagram 300 for gesture recognition according to an embodiment, for example carried out by the gesture recognition device 105.

The gesture recognition is for example applied for a robot 103 having a robot-mounted camera 101 as illustrated in FIG. 1.

According to various embodiments, the approach illustrated in FIG. 2 is combined with the usage of data acquired from other sensors (i.e. in addition to the camera 101) to improve the video data input for gesture recognition. For example, using audio or voice input can help with moving the robot camera 101 to the right direction and orientation to ensure that image data can be captured accurately for gesture recognition. Lidar or IR (infrared) sensors can also be used to accurately position the robot 103 with respect to the hand gestures to ensure accurate video data input capture of the hand 104.

Accordingly, in 301, sensor data from one or more other sensors is acquired and the robot 103 and the camera 101 are positioned such that the camera 101 can take pictures of the hand 104, i.e. can scan the hand gesture.

Once the camera 101 is accurately positioned to scan the hand gesture, the camera 101 takes a sequences of images of the hand 104 in 302.

In 303, to handle strong camera movement and small hand size, a generator of a generative model is applied, which is in this embodiment a generator of a gesture supervised recursive GAN (Generative Adversarial Network) for motion disentangle and high-quality hand image generation. The generator disentangles the hand motion (caused by the gesture) from the camera motion (caused by movement of the robot 103) and thus can handle free camera movements. The generator further increases hand resolution without loss the image quality, to boost the success rate of the hand detection and key point detection. The generator operates in a recursive manner, i.e. generates a motion-compensated (and enhanced) image for a current image of the video 203 based on the current image and the motion-compensated (and enhanced) image generated for a previous image of the video 203.

Thus, the generative model 201 generates a sequence of motion-compensated (and enhanced) images.

To perform multi-stream gesture recognition using fusion 202 of features, multiple streams are generated in 304 which represent the pose or movement of the hand. This may for example be a sequence of representations indicating joint positions, a sequence of representations indicating bone positions or a sequence of representations indicating movement of joints. As representations, graphs (including nodes and edges) may for example be used.

The multiple representations are then processed by a gesture net (i.e. a neural network for gesture recognition) in 305, where the multiple streams are fused by the fusion 202 of features based on a gate attention. Thus, according to one embodiment, the following three sequences of representations are combined: first order (joints), spatial second order (bones) and temporal second order (motion).

In the following, the generative model used in 303 is described in detail.

Figure 4:
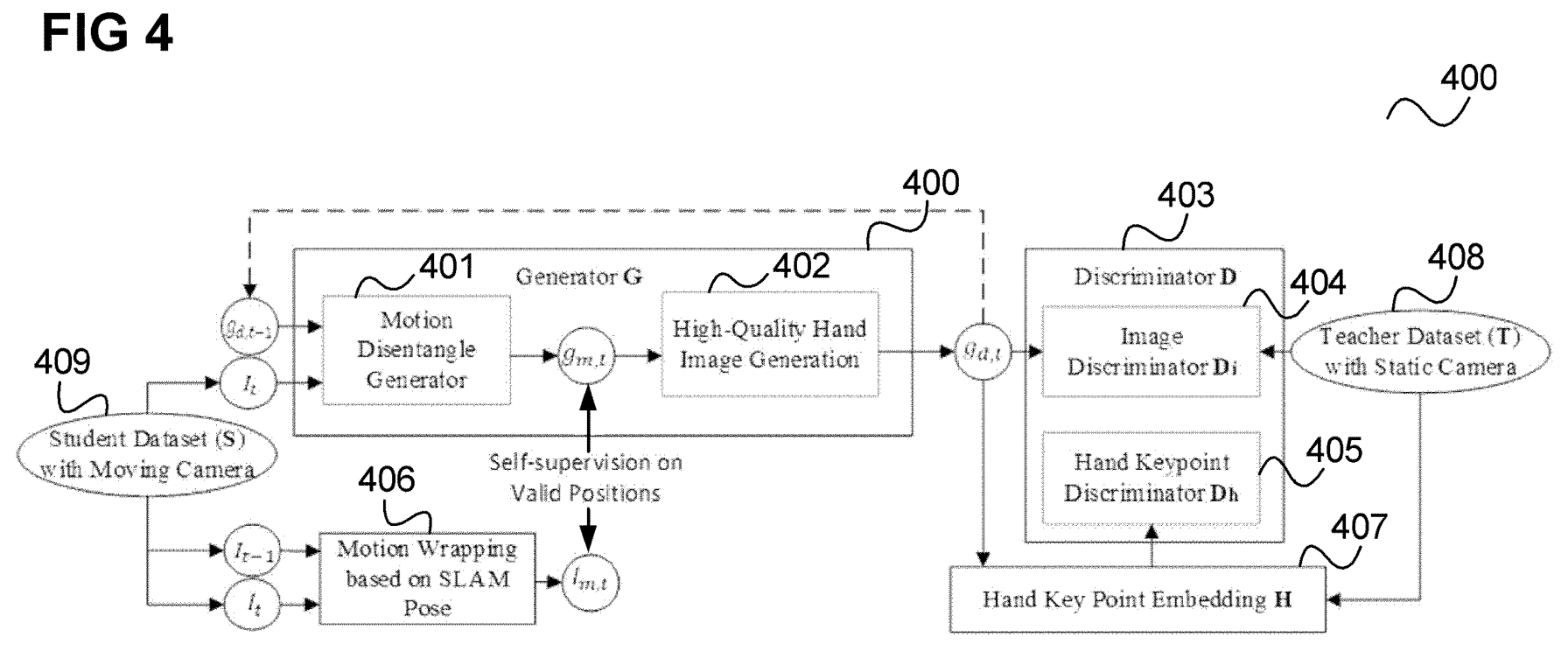

FIG. 4 illustrates operation and training of a generator 400 of a generative model used for gesture recognition according to an embodiment.

The generator 400 includes two sub-generators: a motion disentangle generator 401 (also referred to as motion compensation generator) and a (high-quality) hand image generator 402. For training of the generator 400 (according to GAN training), the generative model includes a discriminator 403 which includes two sub-discriminators: an image discriminator 404 and a hand key point discriminator 405. The training of the generator 400 (as well as the discriminator 403) may be carried out by a training (computer) device. The trained generator 400 may then be stored in the gesture recognition device 105.

In FIG. 4 and in the following explanation, $I_t$ is the current input frame (i.e. the image of the sequence of images for currently, for time index t, being processed by the generator 400), $g_{m,t}$ is the output of the motion disentangle generator 401 (for the current input frame), and $g_{d,t}$ is the output of the hand image generator 402.

For supervision of the motion disentangle generator 401 in training, a reference image is generated by a motion wrapping module 406 for the current input frame $I_t$ based on the current input frame $I_t$ and the preceding input frame $I_{t-1}$ using SLAM (Simultaneous Localization and Mapping) pose generation, for example a SLAM system of the robot 103. This reference image for the current frame (i.e. for time index t) is denoted as $I_{m,t}$.

The motion disentangle generator 401 aligns frame $I_t$ to $I_0$, i.e. adjusts the current input frame $I_t$ so as to compensate the change of the camera viewpoint (i.e. to compensate the camera movement) from time 0 to time t. This means that it generates an image $g_{m,t}$ under the camera pose of $I_0$ (i.e. a reference camera viewpoint) for the current time index t. The motion disentangle generator 401 does this based on the current input frame $I_t$ and based on the image generated by the generator 400 for the preceding input frame $g_{d,t-1}$. Thus, image generation by the generator 400 can be seen to be conducted recursively (or in a closed loop) wherein adjacent frames (i.e. subsequent input frames in the input sequence) are aligned with small pose changes. It should be noted that for the first input frame $I_0$ of the sequence of input images, where there is no preceding image, $g_{m,0}$ may simply be set to $I_0$ because it is already aligned with the reference camera viewpoint.

In training, the sequence of input frames $I_t$ (t=0, 1, . . . T) comes from a student dataset 409 of training images (or training videos).

As mentioned above, the motion disentangle generator 401 is supervised using the output of a motion wrapping module 406, denoted as $I_{m,t}$, for the current input frame $I_t$. For example, the motion wrapping module 406 uses the robot's SLAM system to compute the camera movement between the preceding input frame $I_{t-1}$ and the current frame $I_t$ and re-project the current frame $I_t$ to the camera viewpoint from which the preceding input image $I_{t-1}$ was taken (or generated in case of synthetic generation of training images). Each camera viewpoint is for example given by a camera coordinate system for the respective value of the time index t. The supervision is implemented by including a term punishing a high difference between $g_{m,t}$ and $I_{m,t}$ in the loss of the generator 400.

It should be noted that the wrapping image $I_{m,t}$ does not need to be a complete image since not every pixel on $I_{m,t}$ necessarily has a correspondence pixel on $I_t$. For example, due to the viewpoint difference, some pixel on $I_{m,t}$ may not be observable on $I_t$ due to occlusion. Thus, only those valid pixels which have corresponding points on $I_t$ are used to supervise the motion disentangle generator 401. The valid pixel mask is denoted as $M_{m,t}$ (see the loss function given below). The motion disentangle generator 401, in contrast, generates complete images (having pixel values for all pixel locations).

The hand image generator 402 generates an image $g_{d,t}$ for the current input frame $I_t$ with clear hand appearance for hand gesture recognition. Although hand gesture recognition does not need fine details on the hand appearance and texture, a hand detector may fail for blurred or small sized hands. Thus, the hand image generator 402 is provided to improve the image quality for robust hand detection and/or hand key point detection. In the example of FIG. 4, a hand key point detector 407 is trained on a teacher dataset of training images. The hand key point detector 407 is used in training of the generator 400 and the discriminator 403 and may also be used in 304 to extract a key point (e.g. joint) representation of a hand from a hand image.

To train the image generator 402, the hand key point detector 407 is kept fixed and the image $g_{d,t}$ generated by the hand image generator 402 is fed to the key point detector 407. The hand image generator 402 is trained such that it generates images leading to hand key point embeddings which the hand key point discriminator 405 can distinguish from hand key point embeddings generated from the images of the teacher data set as little as possible, i.e. to lower the ability of the hand key point discriminator 405 to distinguish between images generated by the hand image generator 402 and images from the teacher dataset 408 based on their hand key point embeddings generated by the hand key point embedder 407. In other words, image quality of images generated by the hand image generator 402 is supervised by minimizing a loss based on hand key point detection.

In the recursive image generation process performed by the generator 400 error accumulation and drifting may occur. Therefore, according to one embodiment, the generator 400 and the discriminator 403 are trained in a closed loop as illustrated in FIG. 5.

Figure 5:
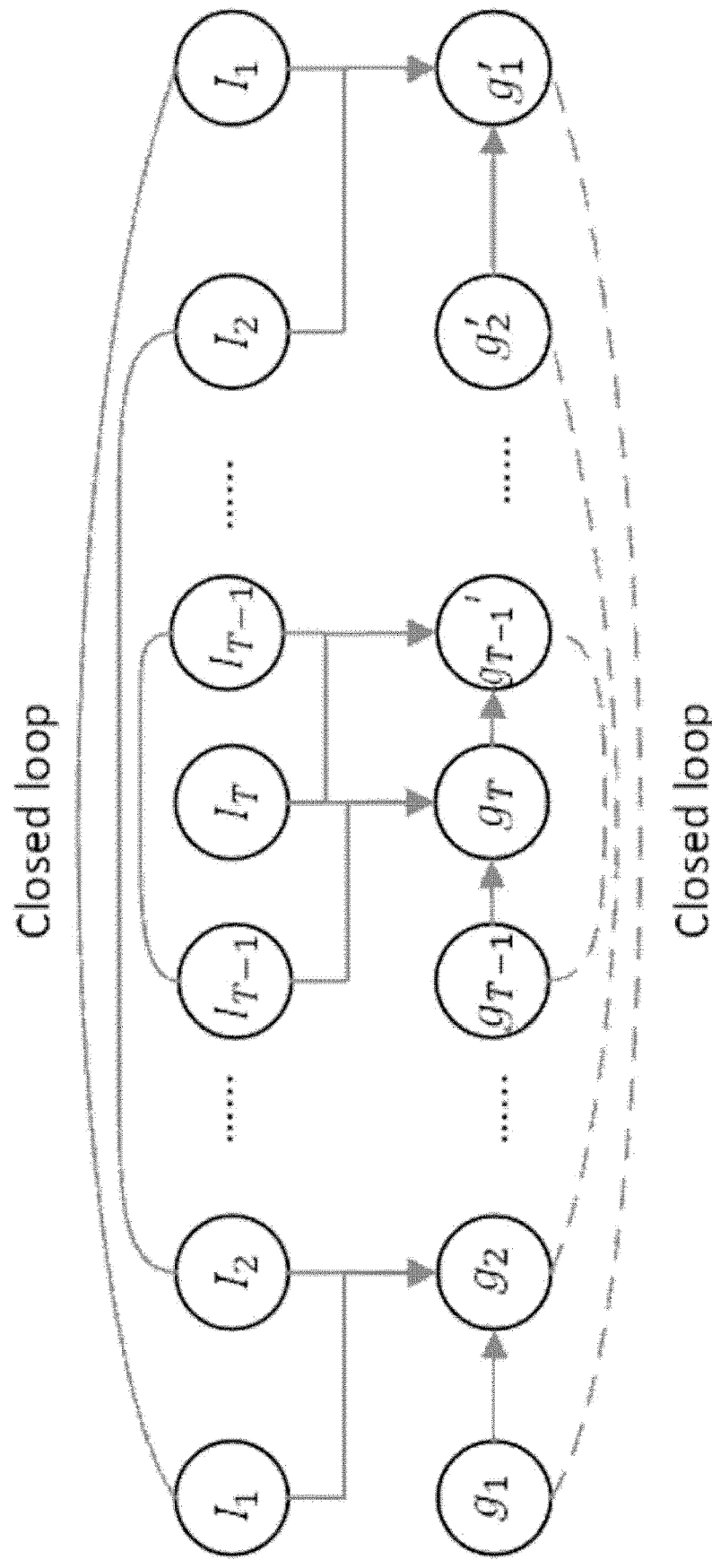
FIG. 5 illustrates a close loop self-supervision according to an embodiment.

FIG. 5 illustrates a close loop self-supervision. Images $g_t=(g_{m,t}, g_{d,t})$ (t=0, 1, . . . , T) are generated in a forward process and $g_t'=(g_{m,t}', g_{d,t}')$ are the images generated in a backward process. First, the generator 400 generates the images $g_t$ recursively from the first frame to the last frame, then reverses the sequence and generates frames from the last frame to the first frame. Thus, it forms a set of closed loops. The forward generated images should be the same as that from backward generated images which is reflected in the loss function for the generator 400.

The loss function $L_G$ for the generator 400 and the loss function $L_D$ for the discriminator 403 are according to an embodiment as follows:

$$L_D = -\frac{1}{M}\left(\sum_{x \in T}\log D_i(x) + \right.$$

$$\sum_{I \in S}\log(1 - D_i(G(I))) + \sum_{x \in T}\log D_h(H(x)) + \left.\sum_{I \in S}\log(1 - D(H(G(I))))\right)$$

$$L_G = -\frac{1}{M}\left(\sum_{I \in S}\log D_i(G(I)) + \sum_{I \in S}\log D_h(H(G(I)))\right) +$$

$$\sum_{I \in S}\sum_{t=1}^{T}\|(g_{m,t} - I_{m,t}) * M_{m,t}\|_2 + \sum_{I \in S}\sum_{t=1}^{T}\|g_{d,t} - g_{d,t}'\|_2 + \sum_{I \in S}\sum_{t=1}^{T}\|g_{m,t} - g_{m,t}'\|_2$$

As mentioned above, in the processing of a gesture net in 305, multiple streams of hand pose or hand movement representations are fused by the fusion 202 of features based on gate attention. This is explained in detail in the following.

Figure 6:
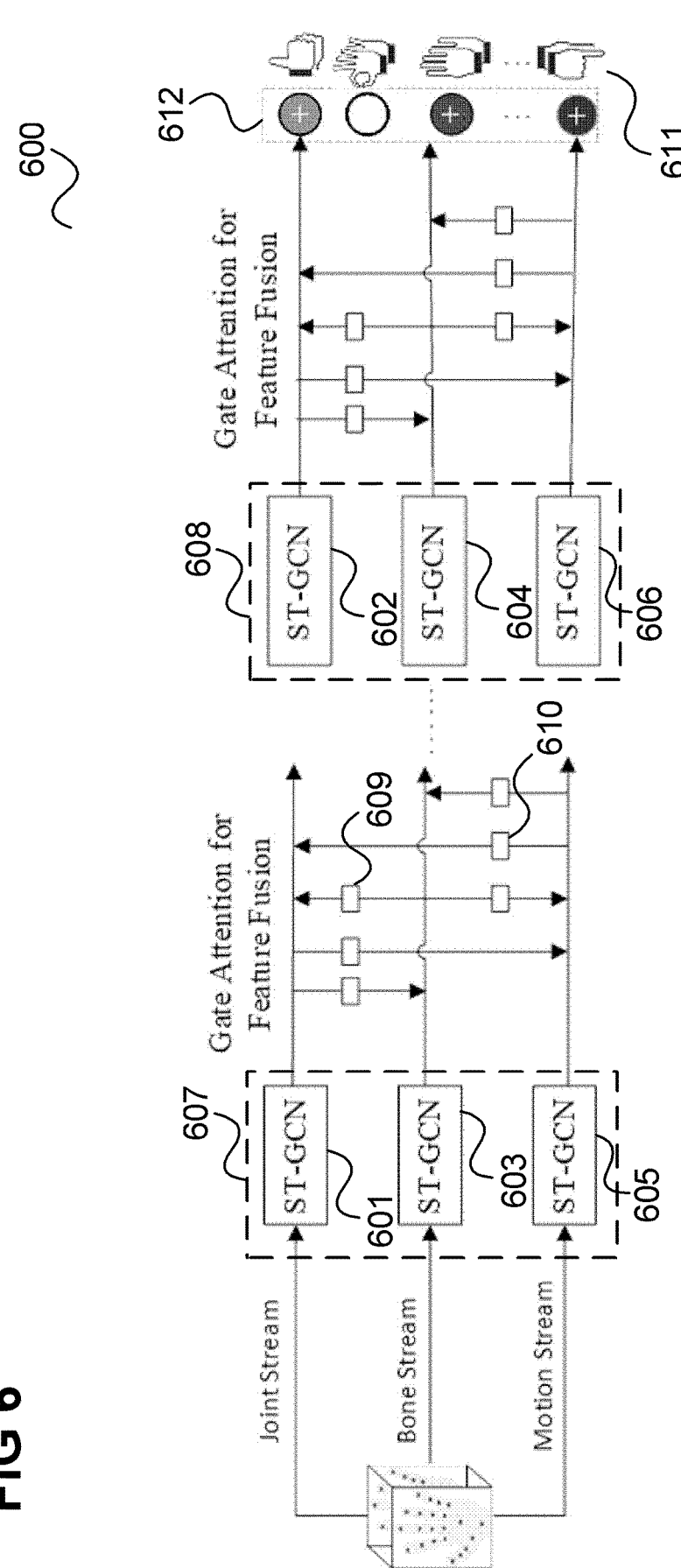
FIG. 6 shows a multi-stream gesture net with gate attention according to an embodiment.

FIG. 6 shows a multi-stream gesture net 600 with gate attention.

The gesture recognition device 105 classifies the input video 203 as one of a plurality of pre-defined gesture classes 611 by means of the multi-stream gesture net 600. In the example of FIG. 6, the multi-stream gesture net 600 is a triple-stream spatial-temporal graph convolutional network to allow robust classification (and thus gesture recognition).

The input to the multi-stream gesture net 600 are multiple streams of representations, i.e. multiple sequences of representations, wherein each representation may for example be given in graph form, i.e. be given by a graph data structure.

Figure 7:
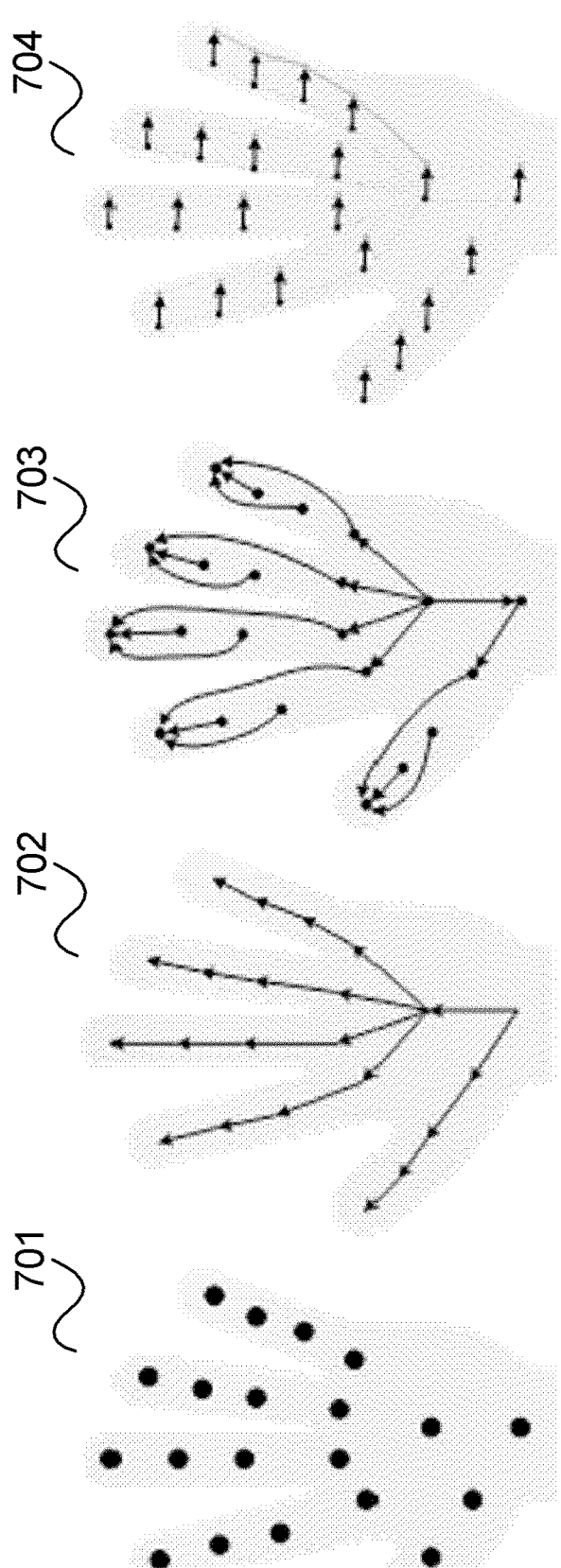
FIG. 7 shows an example of a joint representation, a first bone representation, a second bone representation and a movement representation for a hand according to an embodiment.

FIG. 7 shows an example of a joint representation 701, a first bone representation 702, a second bone representation 703 and a movement (motion) representation 704.

As mentioned above, the hand key point detector 407 may generate (in 304), for each image generated by the generator 400 the joint representation 701 (i.e. the key points are joints represented by nodes in the joint representation 701). From this, the gesture recognition device 105 may generate the first bone representation 702 by connecting adjacent joints. The gesture recognition device 105 may generate the second bone representation 702 by defining key joints (e.g. the finger tip), connecting the key joints and connecting each remaining joint to the nearest key joint. The gesture recognition device 105 may generate the motion representation 704 by assigning, to each joint, a motion vector specifying the movement of the joint between the preceding joint representation (i.e. the joint representation generated for the preceding input frame) and the current frame.

Thus, the gesture recognition device 105 generates sequences (or streams) of representations, in this example three sequences (joint stream, bone stream and motion stream).

For input to a respective ST-GCN (Spatial Temporal Graph Convolutional Network), each sequence of representations is written as a spatial-temporal graph. For the joint representation, the input to the ST-GCN is for example the joint coordinate vectors on the graph nodes (i.e. vertices), i.e. there is a graph node for each joint and its initial features are the coordinates of the joint (so an initial feature map includes coordinates for all joints and for all input frames). These features change as a result of the processing by the ST-GCN (by combination of features of different nodes by convolution). For the motion representation, there is a graph node for each joint and its initial feature is the motion vector of the joint. For the bone stream, the initial feature of each joint is the bone vector pointing from the joint to another joint. The number of nodes is equal to the number of bones. According to one embodiment, the number of joints, bones, and motion nodes are the same for computational convenience.

The gesture net 600 includes, for each stream of representations, a chain of ST-GCNs 601 to 606 forming a chain of processing stages 607, 608. After each processing stage 607, 608, the output of the processing stage 607, 608 for each representation stream is adjusted by the outputs of the processing stage 607, 608 for the other representation streams which are supplied to the representation stream via a respective gate (e.g. gates 609, 610 for the joint stream after the first processing stage 607) which depends on trainable parameters for the gate, wherein the parameters for different gates are independently trainable. The gates 609, 610 are part of gate attention modules (not shown in FIG. 6) which will be described in more detail below with reference to FIG. 8.

The gesture net 600 is trained by a training device (e.g. the same that trains the generator 400, the discriminator 403 and possibly also the hand key point detector 407).

Figure 8:
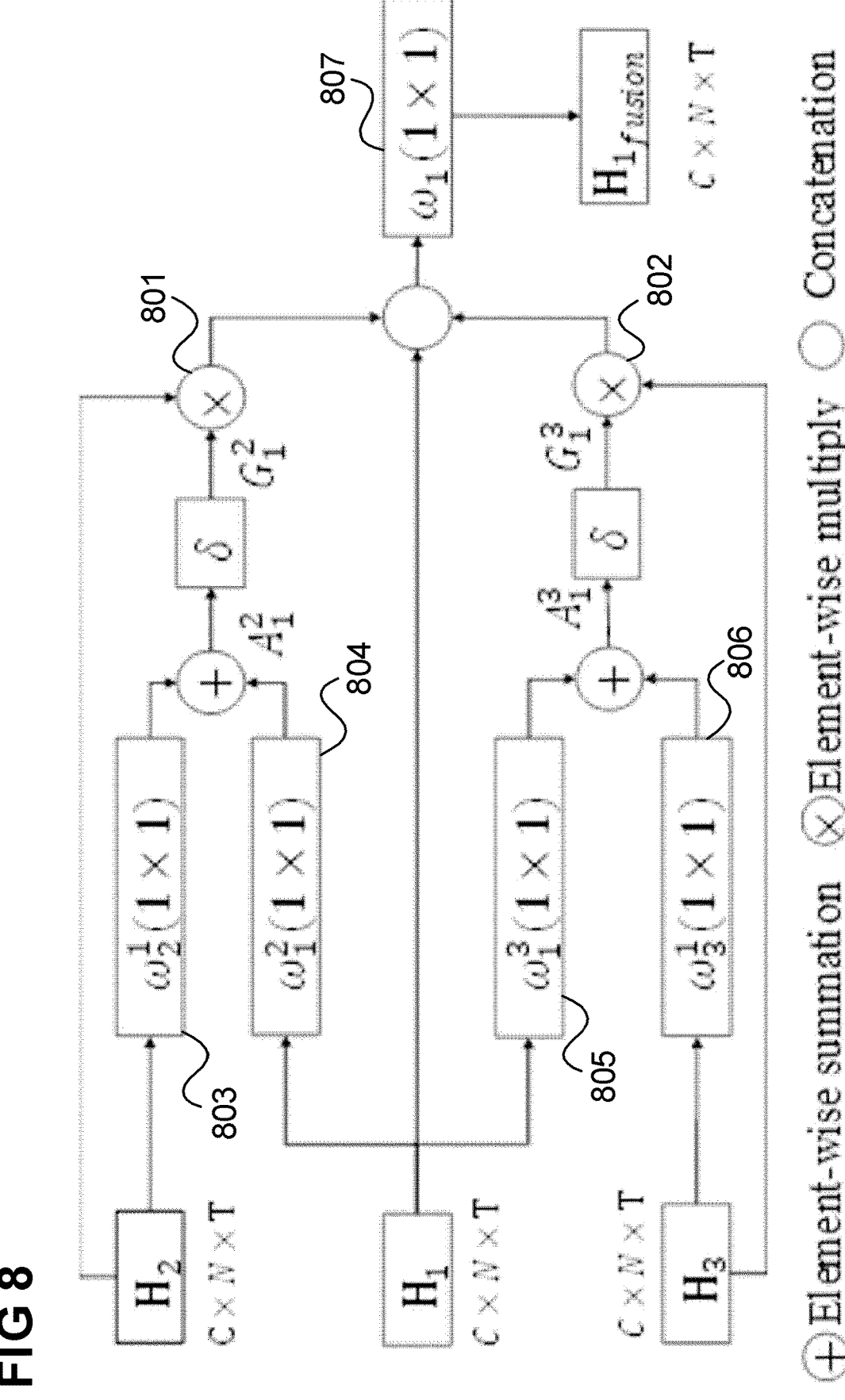
FIG. 8 shows a gate attention module according to an embodiment.

FIG. 8 shows a gate attention module 800.

The gate attention module 800 serves adjusting the output of a processing stage 607, 608 for a first representation stream. This output is referred to as $H_1$ and it includes C×N×T values, wherein N is the number of nodes of the (graph) representation, T is, as above, the number of input frames and C is the number of channels (i.e. the dimensionality of the feature vector assigned to each node). The gate attention module 800 adjusts the output $H_1$ based on the output $H_2$ of the processing stage for a second representation stream and the output $H_3$ of the processing stage for a third representation stream.

The gate attention module includes a first gate 801 and a second gate 802. For example, the first representation stream is the joint stream, the output $H_1$ is the output of the first processing stage 607 for the joint stream, the output $H_2$ is the output of the first processing stage 607 for the bone stream and the output $H_3$ is the output of the first processing stage 607 for the motion stream, the first gate 801 corresponds to the gate 609 and the second gate 802 corresponds to the gate 610. The gesture net 600 includes similar gate attention modules of the second representation stream and the third representation stream (wherein the indices are changed accordingly, i.e. $H_1$ is replaced by $H_2$ for the second representation stream etc.)

Each gate 801, 802 adjusts the value $H_1$ according to a gate attention given by an attention value. The gate attention can be directed or undirected. In the directed case, the attention value of the adjustment i→j (i.e. the adjustment of $H_j$ by $H_i$) is independent from that of j→i. This means that the importance of the ith representation stream to the jth representation stream could be different from the importance of jth representation stream to the ith representation stream. In the undirected case, the ith and jth representation streams share the same importance to each other. According to various embodiments, directed gate attention is used. A gate attention module using undirected gate attention can be seen as a simplified version of the gate attention module 800 and can be deduced from it.

The gate attention module for the jth stream calculates attention values $A_j^i$ of a directed attention map, wherein $A_j^i$ describes the importance of each vertex (i.e. graph node) on the ith stream to the corresponding vertex on the j stream:

$$A_j^i = H_j * \omega_j^i + H_i * \omega_i^j,$$

where '*' denotes convolution, j=1, 2, 3, i=1, 2, 3, and j≠i (j=1 and i=2, 3 in FIG. 8). The $\omega_j^i$ and $\omega_i^j$ are trainable convolution kernels (i.e. specify sets of filter weights) of first to fourth convolutional filters (803, 804, 805, 806 in the example of FIG. 8) indicating the importance weight from stream i to j, and j to i, respectively. The operation of each gate is defined by a gate map $$G_j^i = \delta(A_j^i),$$

where the $\delta(\cdot)$ is the sigmoid function. In the example of FIG. 8, for the first gate 801, i=2 and j=1 and for the second gate 802, i=3 and j=1. Each gate value $G_j^i(c,n, t)$ of the gate map depends on the channel, vertex and frame and represents how much information will be fed from stream i to j, at vertex (n, t) on the $c^{th}$ feature component.

The attention map and the gate map is computed for every pair of streams and thus there are six attention maps and six gate maps.

Finally, the output for the kth stream (k=1 in FIG. 8) after adjustment is given by:

$$H_{k_{fusion}} = \omega_k * f^{cat}(G_k^i \cdot H_i, \ G_k^j \cdot H_j, H_k) + b_k,$$

where k≠i,j and j≠i (i.e. j and i are the remaining two streams, i.e. 2 and 3 in FIG. 8) $f^{cat}$ is the concatenation operator, the "·" is element wise multiplication, co k is a (trainable) convolution kernel of a fifth convolutional filter 807 and $b_k$ is bias. The convolution kernels have dimensions such that the output $H_{k_{fusion}}$ has again C×N×T value and is also denoted as fusion map. The fusion map output for the kth stream merges feature values determined for the other two streams with the feature values determined for the kth stream based on the gate attention values which depend on the trainable convolutional kernels $\omega_k^i$ and $\omega_k^j$ used in the convolutional filters 803, 804, 805, 806.

The output of the last processing stage 608 is fed to one or more (e.g. fully connected) layers 612 which perform the classification (e.g. output soft values for the classes 611).

The input video has for example 20 to 50 frames. Training may for example be performed using the Dynamic Hand gesture 14/28 dataset which is split into trainings samples and testing samples (e.g. 70% to 30%).

Figure 9:
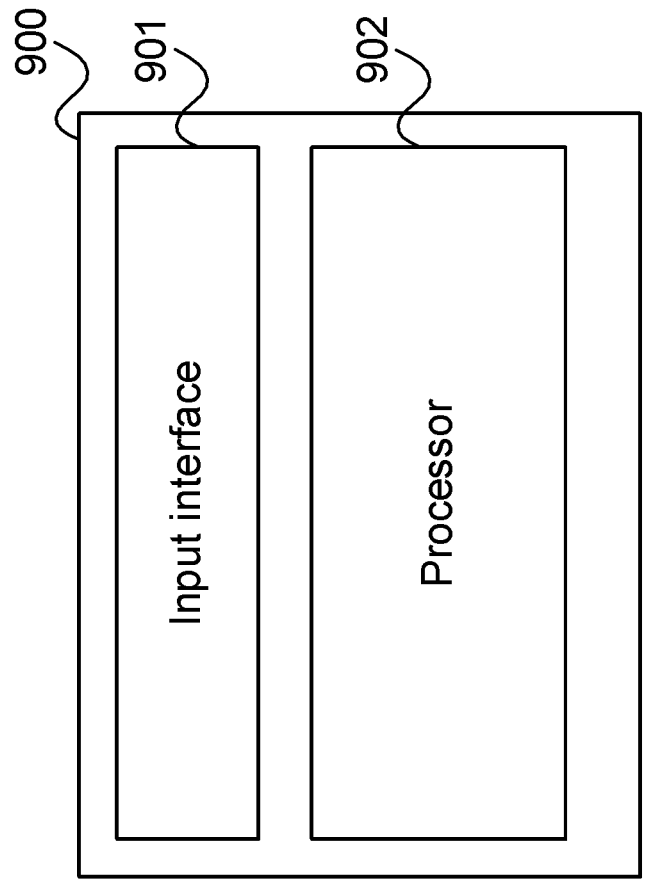
FIG. 9 shows a gesture recognition device according to an embodiment.

According to various examples, in other words, a gesture recognition device is provided as illustrated in FIG. 9.

FIG. 9 shows a gesture recognition device 900 according to an embodiment.

The gesture recognition device includes an input interface 901 configured to receive a sequence of images, each image showing a body part with which a gesture is performed from a viewpoint of a camera.

Further, the gesture recognition device includes a processor 902 configured to generate a sequence of motion-compensated images from the sequence, including: generating a motion-compensated image for an image of the sequence by compensating the movement of the camera viewpoint from a reference camera viewpoint to the viewpoint from which the image shows the body part based on the image and a motion-compensated image of the sequence generated for a preceding image of the sequence which precedes the image in the sequence.

The processor 902 is further configured to estimate the gesture from the sequence of motion-compensated images.

According to various embodiments, in other words, a generator (e.g. of a GAN) is used to compensate the movement of a camera taking pictures for gesture recognition. The generator has a feedback loop in the sense that it uses a motion-compensated image it has generated for an earlier point in time for generation of a motion-compensated image it generates for a current (later) time (assuming that the images are indexed by points in time).

The approach of FIG. 9 allows reliable gesture recognition with a moving camera, e.g. attached to a moving robot. It may for example be applied for hand gesture recognition which is a basic function in various fields including robotics, autonomous driving, human computer interaction, etc. In all these fields, cameras may be strongly moving. In addition, the approach of FIG. 9 can also be applied in other video analysis fields with one or more moving cameras, such as action recognition.

Figure 10:
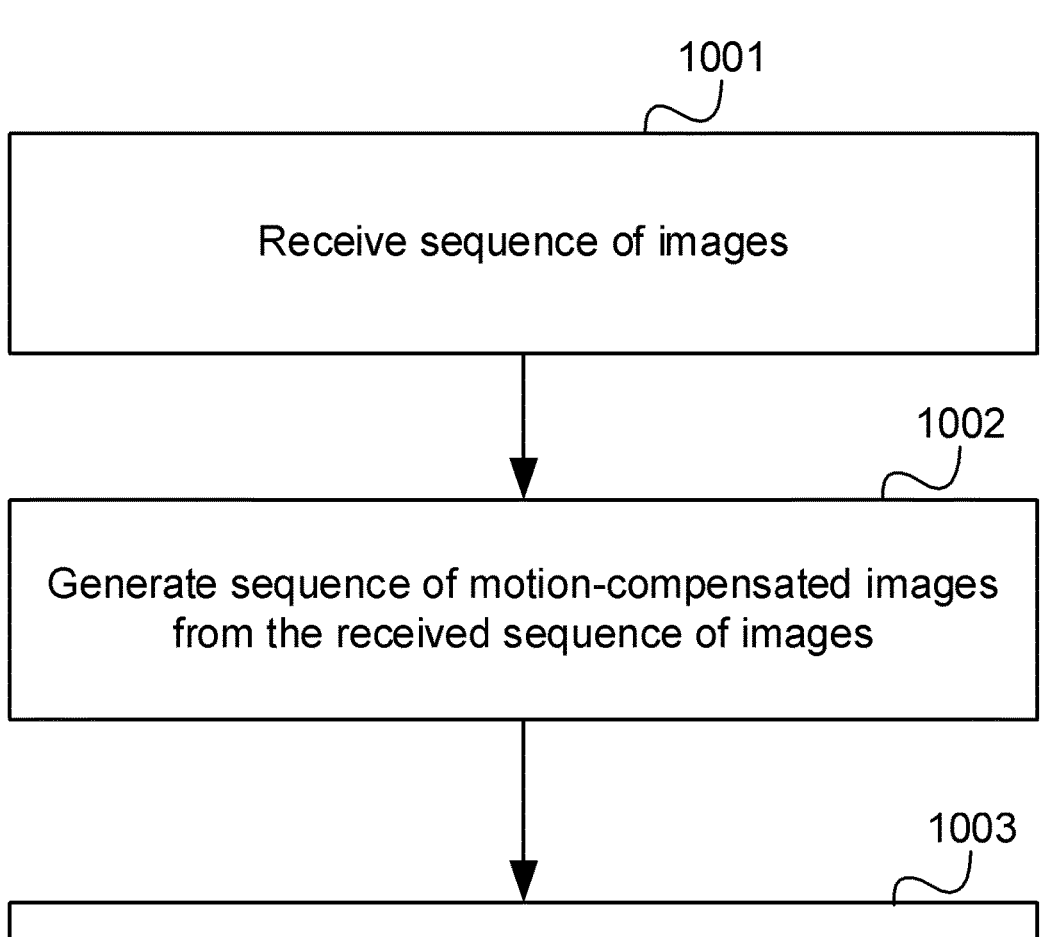
FIG. 10 shows a flow diagram illustrating a method for recognizing a gesture according to an embodiment.

FIG. 10 shows a flow diagram 1000 illustrating a method for recognizing a gesture, for example performed by a gesture recognition device.

In 1001, the gesture recognition device receives a sequence of images, each image showing a body part with which a gesture is performed from a viewpoint of a camera.

In 1002, the gesture recognition device generates a sequence of motion-compensated images from the sequence. The generation of the sequence of motion-compensated images includes generating a motion-compensated image for an image of the sequence by compensating the movement of the camera viewpoint from a reference camera viewpoint to the viewpoint from which the image shows the body part based on the image and a motion-compensated image of the sequence generated for a preceding image of the sequence which precedes the image in the sequence.

1003, the gesture recognition device estimates the gesture from the sequence of motion-compensated images.

The gesture recognition device may receive the sequence of images from a camera of an autonomously moving robot. The recognition device may also be part of the autonomously moving robot.

According to one embodiment, in addition or in alternative to the above, the input interface 901 is configured to receive a plurality of sequences of representations of a pose or movement of a body part and the processor 902 is configured to implement a neural network configured to determine, for each sequence of representations of the plurality of sequences of representations, a feature map and is configured to adjust, in accordance with a first attention map, feature map values determined for a first sequence of representations of the plurality of sequences of representations, by feature map values determined for a second sequence of representations of the plurality of sequences of representations to adjust, in accordance with a second attention map, feature map values determined for the second sequence of representations, by feature map values determined for the first sequence of representations, wherein the second attention map is different from the first attention map and to estimate a gesture from the sequence of motion-compensated images using the adjusted feature map values determined for the first sequence of representations and the adjusted feature map values determined for the second sequence of representations.

Further, the device 900 of FIG. 9 may also be gesture training device (with or without input interface 901) where the processor is configured to train a generator or a gate attention module or both.

The components of the gesture recognition devices and gesture recognition training devices may be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor". The communication device may for example be at least partially implemented by a transceiver which may for example be at least partially implemented by a modem (e.g. an LTE modem), a baseband processor or other transceiver components or also by an application processor. The communication device may for example be a communication terminal as such and may include typical communication terminal devices such as a transceiver (including e.g. a baseband processor, one or more filters, transmit chains, receive chains, amplifiers etc.), an antenna, a subscriber identity module, an application processor, a memory etc.

The following examples pertain to further exemplary implementations.

Example 1 is a gesture recognition device including an input interface configured to receive a sequence of images, each image showing a body part with which a gesture is performed from a viewpoint of a camera; and a processor configured to generate a sequence of motion-compensated images from the sequence, including generating a motion-compensated image for an image of the sequence by compensating the movement of the camera viewpoint from a reference camera viewpoint to the viewpoint from which the image shows the body part based on the image and a motion-compensated image of the sequence generated for a preceding image of the sequence which precedes the image in the sequence; and estimate the gesture from the sequence of motion-compensated images.

Example 2 is the gesture recognition device of Example 1, wherein the processor is configured to implement a generator of a generative adversarial network and is configured to generate the motion-compensated image from the sequence of motion-compensated images by means of the generator.

Example 3 is the gesture recognition device of Example 1 or 2, wherein the processor is configured to generate the motion-compensated image by generating an intermediate image, wherein in the intermediate image the movement of the camera from a reference camera viewpoint to the viewpoint from which the image shows the body part is compensated, and wherein the processor is configured to and generate the motion-compensated image by increasing the image quality of the intermediate image.

Example 4 is the gesture recognition device of Example 3, wherein increasing the image quality of the intermediate image includes deblurring the body part in the intermediate image.

Example 5 is the gesture recognition device of any one of Examples 1 to 4, wherein the processor is further configured to generate, from the a sequence of motion-compensated images, a plurality of sequences of representations of a pose or movement of a body part; implement a neural network configured to determine, for each sequence of representations of the plurality of sequences of representations, a feature map; and a gate attention module configured to adjust, in accordance with a first attention map, feature map values determined for a first sequence of representations of the plurality of sequences of representations, by feature map values determined for a second sequence of representations of the plurality of sequences of representations; to adjust, in accordance with a second attention map, feature map values determined for the second sequence of representations, by feature map values determined for the first sequence of representations; and to estimate a gesture from the sequence of motion-compensated images using the adjusted feature map values determined for the first sequence of representations and the adjusted feature map values determined for the second sequence of representations.

Example 6 is the gesture recognition device of Example 5, wherein the second attention map is different from the first attention map.

Example 7 is a method for recognizing a gesture including receiving a sequence of images, each image showing a body part with which a gesture is performed from a viewpoint of a camera; generating a sequence of motion-compensated images from the sequence, including: generating a motion-compensated image for an image of the sequence by compensating the movement of the camera viewpoint from a reference camera viewpoint to the viewpoint from which the image shows the body part based on the image and a motion-compensated image of the sequence generated for a preceding image of the sequence which precedes the image in the sequence; and estimating the gesture from the sequence of motion-compensated images.

Example 8 is a gesture recognition training device including: a processor configured to train a generator for generating a motion-compensate image for an image of a sequence of images taken by a camera, each image showing a body part with which a gesture is performed from a viewpoint of a camera, by compensating the movement of the camera from a reference camera viewpoint to the viewpoint from which the image shows the body part based on the image and based on a motion-compensated image of the sequence generated for a preceding image of the sequence which precedes the image in the sequence by adjusting the generator to lower the ability of a discriminator to detect that a motion-compensated image generated by the generator has been generated by the generator.

Example 9 is the gesture recognition training device of Example 8, wherein the processor is further configured to train the discriminator to distinguish between motion-compensated images generated by the generator and images from a reference image data set.

Example 10 is the gesture recognition training device of Example 9, wherein the processor is configured to train the discriminator to distinguish a motion-compensated image generated by the generator and an image from the reference image data set based on key point embeddings generated for the motion-compensated image and the image from the reference image data set.

Example 11 is the gesture recognition training device of Example 8 or 9, wherein the generator is configured to generate the motion-compensated image by generating an intermediate image in which the movement of the camera from a reference camera viewpoint to the viewpoint from which the image shows the body part is compensated and generating the motion-compensated image by increasing the image quality of the intermediate image and wherein the processor is configured to train the generator to reduce the difference between the intermediate image and a reference intermediate image generated from the motion-compensated image by motion compensation performed based on a determination of a camera viewpoint difference from the image and the preceding image.

Example 12 is the gesture recognition training device of Example 11, wherein the processor is configured to determine the camera viewpoint difference by Simultaneous Localization and Mapping.

Example 13 is a method for training a generator including adjusting a generator for generating a motion-compensate image for an image of a sequence of images taken by a camera, each image showing a body part with which a gesture is performed from a viewpoint of a camera, by compensating the movement of the camera from a reference camera viewpoint to the viewpoint from which the image shows the body part based on the image and based on a motion-compensated image of the sequence generated for a preceding image of the sequence which precedes the image in the sequence, wherein the generator is adjusted to lower the ability of a discriminator to detect that a motion-compensated image generated by the generator has been generated by the generator.

Example 14 is a gesture recognition device including: an input interface configured to receive a plurality of sequences of representations of a pose or movement of a body part; and a processor configured to implement a neural network configured to determine, for each sequence of representations of the plurality of sequences of representations, a feature map; and adjust, in accordance with a first attention map, feature map values determined for a first sequence of representations of the plurality of sequences of representations, by feature map values determined for a second sequence of representations of the plurality of sequences of representations; adjust, in accordance with a second attention map, feature map values determined for the second sequence of representations, by feature map values determined for the first sequence of representations, wherein the second attention map is different from the first attention map; and estimate a gesture from the sequence of motion-compensated images using the adjusted feature map values determined for the first sequence of representations and the adjusted feature map values determined for the second sequence of representations.

Example 15 is the gesture recognition device of Example 14, wherein the processor is configured to determine the first attention map and the second attention map.

Example 16 is the gesture recognition device of Example 14 or 15, wherein the processor is configured to determine the first attention map depending on a first set of neural network parameters and the second attention map depending on a second set of neural network parameters, wherein the neural network parameters are independently trainable.

Example 17 is the gesture recognition device of Example 16, wherein the neural network is a convolutional neural network and the neural network parameters of the first set of neural network parameters and of the second set of neural network parameters are filter weights.

Example 18 is the gesture recognition device of any one of Examples 14 to 17, wherein the neural network is configured to determine the feature map by processing an input feature map.

Example 19 is the gesture recognition device of any one of Examples 14 to 18, wherein the processor is configured to determine the first attention map and the second attention map based on the input feature map.

Example 20 is the gesture recognition device of any one of Examples 14 to 19, wherein the processor is configured to determine the first attention map from the feature map values determined for the first sequence of representations and to determine the second attention map from the feature map values determined for the second sequence of representations.

Example 21 is the gesture recognition device of any one of Examples 14 to 20, wherein each sequence of representation has a plurality of nodes and the feature map for the sequence of representations has a vector of feature values for each node.

Example 22 is the gesture recognition device of any one of Examples 14 to 21, wherein each representation has nodes and the feature map for the sequence of representations has a vector of feature values for each node for each representation.

Example 23 is the gesture recognition device of any one of Examples 14 to 22, wherein the neural network includes a sequence of neural network stages beginning with a first neural network stage and ending with a last neural network stage, wherein the first neural network stage is configured to receive as input, for each sequence of representations, an initial feature map and each neural network stage is configured to generate, for each sequence of representations, a feature map based on a feature map it receives as input and each neural network stage except the last is configured to provide the feature map it has generated as input to the following neural network stage; and the processor is configured to, for each neural network stage adjust, in accordance with a respective first attention map, feature map values determined by the neural network stage for the first sequence of representations, by feature map values determined for the second sequence of representations of the plurality of sequences of representations; and to adjust, in accordance with a respective second attention map, feature map values determined for the second sequence of representations, by feature map values determined for the first sequence of representations, wherein the second attention map is different from the first attention map.

Example 24 is the gesture recognition device of Example 23, wherein for at least one sequence of representations, the initial feature map includes joint positions of the body part.

Example 25 is the gesture recognition device of Example 23 or 24, wherein for at least one sequence of representations, the initial feature map includes movement vectors of joints of the body part specifying movement of joints over the sequence of representations.

Example 26 is a method for recognizing a gesture including: receiving a plurality of sequences of representations of a pose or movement of a body part; determining, by a neural network, for each sequence of representations of the plurality of sequences of representations, a feature map; adjusting, in accordance with a first attention map, feature map values determined for a first sequence of representations of the plurality of sequences of representations, by feature map values determined for a second sequence of representations of the plurality of sequences of representations; adjusting, in accordance with a second attention map, feature map values determined for the second sequence of representations, by feature map values determined for the first sequence of representations, wherein the second attention map is different from the first attention map; and estimating a gesture from the sequence of motion-compensated images using the adjusted feature map values determined for the first sequence of representations and the adjusted feature map values determined for the second sequence of representations.

Example 27 is a gesture recognition training device including: a processor configured to train a gate attention module to adjust, in accordance with a first attention map, feature map values determined for a first sequence of representations of a plurality of sequences of representations, by feature map values determined for a second sequence of representations of the plurality of sequences of representations and adjust, in accordance with a second attention map, feature map values determined for the second sequence of representations, by feature map values determined for the first sequence of representations by adjusting a first set of neural network parameters and a second set of neural network parameters, wherein the gate attention module determines the first attention map from the feature map values determined for the first sequence of representations depending on the first set of neural network parameters and the gate attention module determines the second attention map from the feature map values determined for the second sequence of representations depending on the second set of neural network parameters.

Example 28 is a method for training a gate attention module for a gesture recognition device, including: training the gate attention module to adjust, in accordance with a first attention map, feature map values determined for a first sequence of representations of a plurality of sequences of representations, by feature map values determined for a second sequence of representations of the plurality of sequences of representations and adjust, in accordance with a second attention map, feature map values determined for the second sequence of representations, by feature map values determined for the first sequence of representations by adjusting a first set of neural network parameters and a second set of neural network parameters, wherein the gate attention module determines the first attention map from the feature map values determined for the first sequence of representations depending on the first set of neural network parameters and the gate attention module determines the second attention map from the feature map values determined for the second sequence of representations depending on the second set of neural network parameters.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A gesture recognition device comprising:
an input interface configured to receive a sequence of images, each image showing a body part with which a gesture is performed from a camera viewpoint; and
a processor configured to:
generate a sequence of motion-compensated images from the sequence of images, the sequence of motion-compensated images comprising:
a motion-compensated image for an image of the sequence of images, wherein the processor configured to generate the motion-compensated image comprises the processor configured to compensate for movement of the camera viewpoint from a reference camera viewpoint to a viewpoint from which the image shows the body part based on the image; and
an other motion-compensated image generated for a preceding image of the sequence of images which precedes the image in the sequence of images;
generate, from the sequence of motion-compensated images, a plurality of sequences of representations of a pose or movement of a body part; and
implement a neural network configured to determine, for each sequence of representations of the plurality of sequences of representations, a feature map;
adjust, in accordance with a first attention map, feature map values determined for a first sequence of representations of the plurality of sequences of representations, by feature map values determined for a second sequence of representations of the plurality of sequences of representations;
adjust, in accordance with a second attention map, feature map values determined for the second sequence of representations, by feature map values determined for the first sequence of representations; and
estimate the gesture from the sequence of motion-compensated images using the adjusted feature map values determined for the first sequence of representations and the adjusted feature map values determined for the second sequence of representations.

2. The gesture recognition device of claim 1, wherein the processor is configured to implement a generator of a generative adversarial network and is configured to generate the motion-compensated image from the sequence of motion-compensated images by means of the generator.

3. The gesture recognition device of claim 1, wherein the processor is configured to generate the motion-compensated image by generating an intermediate image, wherein the intermediate image compensates for camera movement from the reference camera viewpoint to the viewpoint from which the image shows the body part, and wherein the processor is configured to generate the motion-compensated image by increasing an image quality of the intermediate image.

4. The gesture recognition device of claim 3, wherein increasing the image quality of the intermediate image comprises deblurring the body part in the intermediate image.

5. The gesture recognition device of claim 1, wherein the second attention map is different from the first attention map.

6. A gesture recognition device comprising:
an input interface configured to receive a plurality of sequences of representations of a pose or movement of a body part; and
a processor configured to
implement a neural network configured to determine, for each sequence of representations of the plurality of sequences of representations, a feature map; and
adjust, in accordance with a first attention map, feature map values determined for a first sequence of representations of the plurality of sequences of representations, by feature map values determined for a second sequence of representations of the plurality of sequences of representations;
adjust, in accordance with a second attention map, feature map values determined for the second sequence of representations, by feature map values determined for the first sequence of representations, wherein the second attention map is different from the first attention map; and
estimate a gesture from the sequence of motion-compensated images using the adjusted feature map values determined for the first sequence of representations and the adjusted feature map values determined for the second sequence of representations.

7. The gesture recognition device of claim 6, wherein the processor is configured to determine the first attention map and the second attention map.

8. The gesture recognition device of claim 6, wherein the processor is configured to determine the first attention map depending on a first set of neural network parameters and the second attention map depending on a second set of neural network parameters, wherein the neural network parameters are independently trainable.

9. The gesture recognition device of claim 8, wherein the neural network is a convolutional neural network and the neural network parameters of the first set of neural network parameters and of the second set of neural network parameters are filter weights.

10. The gesture recognition device of claim 6, wherein the neural network is configured to determine the feature map by processing an input feature map.

11. The gesture recognition device of claim 6, wherein the processor is configured to determine the first attention map and the second attention map based on the input feature map.

12. The gesture recognition device of claim 6, wherein the processor is configured to determine the first attention map from the feature map values determined for the first sequence of representations and to determine the second attention map from the feature map values determined for the second sequence of representations.

13. The gesture recognition device of claim 6, wherein each sequence of representation has a plurality of nodes and the feature map for the sequence of representations has a vector of feature values for each node.

14. The gesture recognition device of claim 6, wherein each representation has nodes and the feature map and each node for each representation has a vector of feature values.

* * * * *